(12) United States Patent
Burnett et al.

(10) Patent No.: US 7,163,649 B2
(45) Date of Patent: Jan. 16, 2007

(54) MINIMIZING SPATIAL-DISPERSION-INDUCED BIREFRINGENCE

(75) Inventors: John H. Burnett, Washington, DC (US); Zachary H. Levine, Rockville, MD (US); Eric L. Shirley, Germantown, MD (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 727 days.

(21) Appl. No.: 10/190,625

(22) Filed: Jul. 9, 2002

(65) Prior Publication Data

US 2003/0012724 A1    Jan. 16, 2003

Related U.S. Application Data

(60) Provisional application No. 60/309,192, filed on Aug. 1, 2001, provisional application No. 60/303,898, filed on Jul. 9, 2001.

(51) Int. Cl.
*G02B 5/20* (2006.01)
*C01B 9/08* (2006.01)
*C02F 1/00* (2006.01)

(52) U.S. Cl. .................... 252/584; 252/585; 252/588; 423/464; 359/321; 359/885

(58) Field of Classification Search ............... 423/464; 252/584, 585, 588; 359/885, 321
See application file for complete search history.

(56) References Cited

U.S. PATENT DOCUMENTS 5,905,554 A    5/1999    Kyu

| 6,201,634 B1 | 3/2001 | Sakuma et al. | |
| 6,226,128 B1 | 5/2001 | Shiozawa | |
| 6,238,479 B1 | 5/2001 | Oba | |
| 6,377,332 B1 | 4/2002 | Sakuma et al. | |
| 6,395,657 B1 | 5/2002 | Mayolet et al. | |
| 6,649,326 B1 * | 11/2003 | Allan et al. | 430/311 |
| 2001/0008540 A1 | 7/2001 | Oba et al. | |
| 2004/0021943 A1 * | 2/2004 | Sewell | 359/499 |

OTHER PUBLICATIONS

Pastrnak et al; "Optical Anisotropy of Silicon Single Crystals*"; Physical Review B; vol. 3, No. 8, Apr. 15, 1971, pp. 2567-2571.
Yu et al; "Spatial Dispersion in the Dielectric Constant of GaAs*"; Solid State Communications; vol. 9,, pp. 1421-1424, 1971.
Chernevskaya et al; "Structure of Mixed Crystals Based on $CaF^2$, $SrF^2$, and $BaF^{2»}$"; Soviet Physics-Solid State; vol. 8, No. 1; Jul. 1966; pp. 169-171.
Chang et al; "Raman Scattering from Mixed Crystals $(Ca_xDt_{1-x})F_2$ AND $(Sr_xBa_{1-x})F_2$"; Physical Review Letters; vol. 17, No. 15, Oct. 3, 1966; pp. 755-758.

* cited by examiner

*Primary Examiner*—Philip C. Tucker
(74) *Attorney, Agent, or Firm*—Stites & Harbison PLLC; Ross F. Hunt, Jr.

(57) ABSTRACT

A composition formed from Group II fluorides in which the composition has little or no intrinsic birefringence at a selected wavelength. The composition is a mixed solid solution of $CaF_2$ with a second crystal of $SrF_2$ or $BaF_2$. The resulting composition is in the form of $Ca_{1-x}Sr_xF_2$ or $Ca_{1-x}Ba_xF_2$, or a combination of $SrF_2$ and $BaF_2$, in the form of $Ca_{1-x-y}Sr_xBa_yF_2$. The specific form of the composition that effectively nulls out the intrinsic birefringence at a selected wavelength within the UV range is determined in one preferred method from the magnitudes of the intrinsic birefringences of the components, $CaF_2$, $SrF_2$, and $BaF_2$.

17 Claims, 3 Drawing Sheets

MINIMIZING SPATIAL-DISPERSION-INDUCED BIREFRINGENCE

CROSS-REFERENCE TO RELATED APPLICATIONS

This application claims benefit of the filing date of copending Provisional Patent Application Nos. 60/303,898, filed on Jul. 9, 2001, and 60/309,192, filed on Aug. 1, 2001.

STATEMENT REGARDING FEDERALLY SPONSORED RESEARCH

This invention was made by employees of the United States Government and may be manufactured and used by or for the Government for governmental purposes without the payment of any royalties.

FIELD OF THE INVENTION

The present invention concerns birefringence in crystals used in optical systems, and more specifically to mixed solid solutions of fluoride crystals in order to minimize spatial-dispersion-induced birefringence in components of optical systems.

BACKGROUND OF THE INVENTION

Fluoride crystals, such as calcium fluoride, strontium fluoride, and barium fluoride, are widely utilized in high precision optics, including UV optical lithography. These crystals exhibit high transmittance within a broad range of wavelengths from the infrared through the UV, below 157 nm. Accordingly, these crystals are used in various kinds of optical elements for precision UV optics, including lenses, prisms, and beam splitters.

A major complication presently associated with crystals used in precision optical systems is a phenomenon known as birefringence. Birefringence, also known as double refraction, refers to the dependence of refractive index on light polarization direction. Most crystalline materials are naturally birefringent and have anisotropic optical properties due to their asymmetric crystalline structure. However, it is generally thought that crystals with cubic-symmetry crystal structure are constrained by their high symmetry to have no inherent birefringence and have isotropic optical properties. As a result, these cubic crystals were believed to be ideal for use in precision optical systems. Birefringence in these crystals used in optical systems is generally thought to be primarily caused by mechanical stress or strain incorporated during the crystal fabrication process, and substantial efforts have gone towards reducing this stress-induced birefringence.

However, it has been recently discovered that cubic crystals such as calcium fluoride, barium fluoride, and strontium fluoride have an intrinsic birefringence, in addition to the above-mentioned stress induced birefringence as disclosed in John H. Burnett, Zachary H. Levine, and Eric L. Shirley, "Intrinsic Birefringence in 157 nm Materials," in R. Harbison, ed., $2^{nd}$ International Symposium on 157 nm Lithography, (International SEMATECH, Austin, Tex., 2001); John H. Burnett, Zachary H. Levine, and Eric L. Shirley, "Intrinsic Birefringence in 157 nm Materials," in R. Harbison, ed., Calcium Fluoride Birefringence Workshop, (International SEMATECH, Austin, Tex., 2001); John H. Burnett, Zachary H. Levine, and Eric L. Shirley, "Intrinsic birefringence in calcium fluoride and barium fluoride," Phys. Rev. B 64, 241102 (2001) (hereinafter "Intrinsic birefringence in calcium fluoride and barium fluoride"), all incorporated herein by reference. This birefringence is caused by the symmetry-breaking effect of the finite wave vector q of the photon, and is known as spatial-dispersion-induced birefringence, or intrinsic birefringence. This phenomenon was first discussed by H. A. Lorentz in 1878. It was first convincingly demonstrated in 1971 in Si from J. Pastrnak and K. Vedam, in Phys. Rev. B 3, 2567 (1971) (hereinafter "Pastrnak") and in GaAs from P.Y. Yu and M. Cardona, Solid State Commun. 9, 1421 (1971), both incorporated herein by reference, but the implications for precision UV optics were not explored.

The problem of intrinsic birefringence must be addressed in precision UV optical systems incorporating crystalline optics because the magnitude of the birefringence in the UV is larger than the present industry specifications, e.g., for 157 nm lithography as was reported by A. K. Bates, in Proceedings of the First International Symposium on 157 nm Lithography, ed. by R. Harbison (International SEMATECH, Austin, 2000), p. 377, (hereafter "Bates") incorporated herein by reference.

This complication presents serious challenges to optical engineers because, unlike stress-induced birefringence, intrinsic birefringence is inherent to the material, and thus cannot be reduced by material improvements in a single material.

Four main problems result from this intrinsic birefringence. The first problem is that a different refraction occurs for the two polarization components at the lens surface, which causes a ray bifurcation at each lens. A second problem is that each polarization component accumulates a different phase as it transverses the crystal, resulting in phase-front distortion. A third problem is that an index anisotropy necessarily accompanies the birefringence. These combined effects of intrinsic birefringence cause blurring of the image, which limits the achievable resolution. A fourth problem is an alteration of the polarization state of light as it traverses the optics, which is significant for optical systems using polarized light. Accordingly, there exists a strong need to correct the problem of intrinsic birefringence in crystals used in high precision UV optical systems.

BRIEF SUMMARY OF THE INVENTION

The present invention concerns a method to eliminate or reduce the intrinsic birefringence in cubic crystals made from Group II fluorides, namely $CaF_2$, $SrF_2$, $BaF_2$, and $MgF_2$. The method is based on the discovery that $CaF_2$ has a value of the intrinsic birefringence of opposite sign to that of $SrF_2$ or $BaF_2$. As a result, mixed solid solutions of these materials, e.g., $Ca_{1-x}Sr_xF_2$, $Ca_{1-x}Ba_x$, $F_2$, $Ca_{1-x-y}Sr_xBa_yF_2$, $Ca_{1-x-y}Sr_xMg_yF_2$, will have its intrinsic birefringence nulled at a given wavelength with appropriately chosen values of x (and y).

In accordance with one aspect of the present invention, a composition includes a mixture of $CaF_2$ crystal and a second crystal, said composition having minimal spatial dispersion induced birefringence at a selected wavelength within the UV range.

In accordance with another aspect of the present invention, a method for making a non-birefringent material includes selecting a wavelength, and mixing $CaF_2$ crystal with a second crystal to form a composition having minimized spatial dispersion induced birefringence at the selected wavelength.

In accordance with yet another aspect of the present invention, a device includes an optical element formed from at least one composition comprising a mixture of $CaF_2$ crystal and at least one additional crystal. The composition is selected from the group consisting of $Ca_{1-x-y}Sr_xBa_yF_2$, $Ca_{1-x-y}Sr_xMg_yF_2$, and $Ca_{1-x-y}Ba_xMg_yF_2$, where x and y having values selected so as to form the composition with minimal intrinsic birefringence.

Further features and advantages of the present invention will be set forth in, or apparent from, the detailed description of preferred embodiments thereof which follows.

BRIEF DESCRIPTION OF THE DRAWINGS

The invention will now be described in detail with respect to preferred embodiments with reference to the accompanying drawings, wherein.

DETAILED DESCRIPTION OF THE INVENTION

Figure 1:
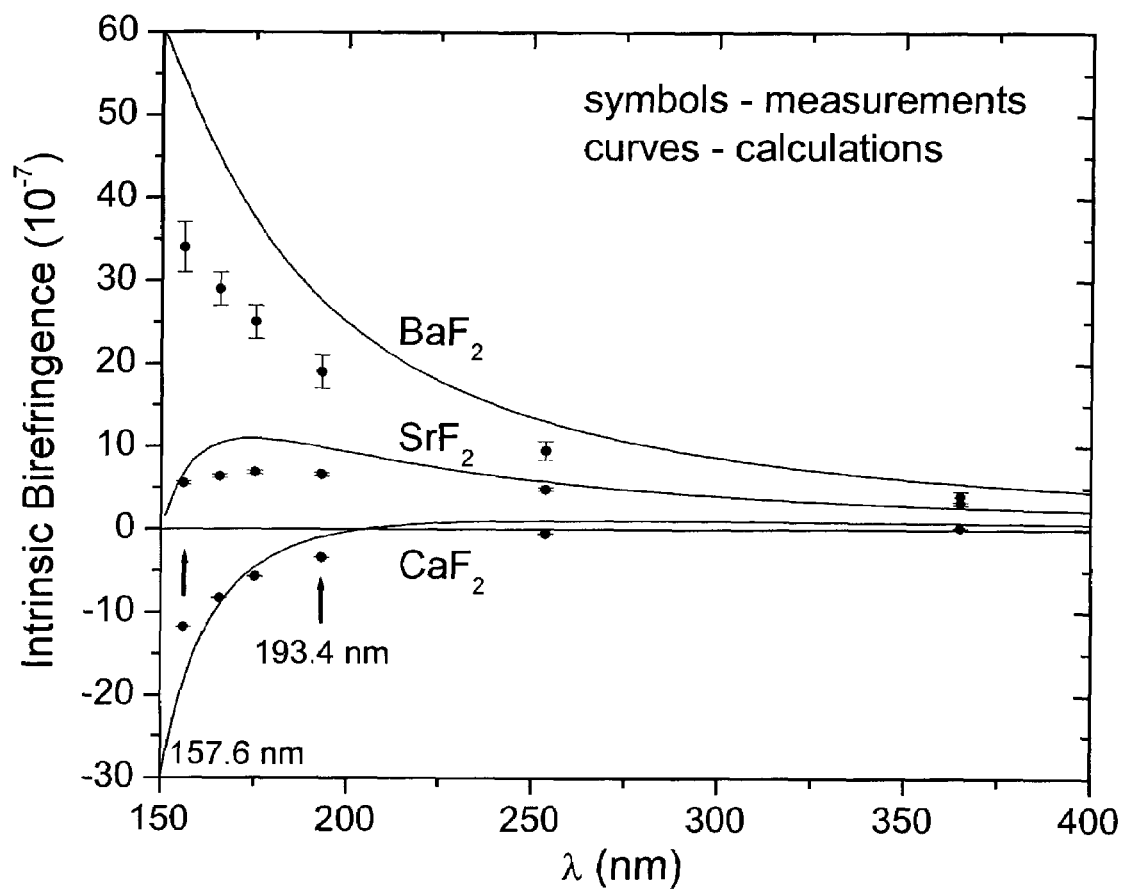
FIG. 1 is a plot depicting the relationship between intrinsic birefringence and wavelength for $CaF_2$, $SrF_2$, and $BaF_2$ in accordance with the present invention.

In accordance with one aspect of the present invention, there is provided a composition formed from single-crystal mixed solid solutions of Group II fluorides in which the composition has little or no intrinsic birefringence at a selected wavelength. The composition is a mixed solid solution of $CaF_2$ with additional components of $SrF_2$, $BaF_2$, and/or $MgF_2$. $CaF_2$ has a negative sign for the intrinsic birefringence whereas $SrF_2$ or $BaF_2$ has a positive sign of the intrinsic birefringence. Addition of Mg gives a negative contribution to the intrinsic birefringence. The resulting composition is in the form of $Ca_{1-x}Sr_xF_2$ or $Ca_{1-x}Ba_xF_2$, or a combination of $SrF_2$, $BaF_2$, and $MgF_2$, in the form of, e.g., $Ca_{1-x-y}Sr_xBa_yF_2$. The specific form of the composition that effectively nulls out the intrinsic birefringence at a selected wavelength within the UV range is determined from the magnitudes of the of the intrinsic birefringences of the components, $CaF_2$, $SrF_2$, and $BaF_2$. The effect of the addition of Mg is determined by calculated intrinsic birefringence of a theoretical cubic-symmetry $MgF_2$, crystal.

In order to create the mixed crystal composition of the present invention, the intrinsic birefringences of the individual crystal components are first determined by measurement and calculation. The measurement method is based on determining the amount of phase compensation needed to null out light transmitted through an oriented sample between crossed polarizers in a way similar to that described in Pastrnak, but with modifications for operation in the vacuum ultraviolet, as described in "Intrinsic birefringence in calcium fluoride and barium fluoride."

Measuring the effect as a function of wavelength in the VUV required operation in an oxygen-free, nitrogen-purge environment with VUV polarizers and a phase compensator, and using as illumination sources a series of VUV atomic spectral lines. These were obtained from carbon I emission from $CO_2$ introduced in a custom argon mini-arc lamp, filtered though a monochromator, Bridges et al, *Appl. Opt.* 16, 367 (1977) incorporated herein by reference. The longer-wavelength UV measurements were made using an electrodeless Hg lamp. The spectral line emission was chopped, collimated by a paraboloidal mirror, and linearly polarized by a $MgF_2$ Rochon polarizer. The polarized light passed through the sample on a rotation stage and a $MgF_2$ Soleil-Babinet compensator oriented 45° to the polarizer, and impinged on a crossed $MgF_2$ Rochon polarizer. Light that was transmitted through the crossed polarizer, as a result of birefringence of the sample or compensator, was detected by a CsI or CsSb photomultiplier tube, using a lock-in amplifier. The amount of phase compensation needed by the compensator to null out the birefringence for a certain crystal orientation discussed below, determined the intrinsic birefringence of the material at a given wavelength. The crystal geometry and orientation used for the measurements were right rectangular parallelepipeds, with faces normal to the [110], [−110], and [001] crystallographic directions. The light propagation direction was in the [110] direction.

The value of the birefringence $\Delta n = n_{<-110>} - n_{<001>}$ was determined for $CaF_2$, $SrF_2$, and $BaF_2$ for six wavelengths from 365.06 nm to 156.10 nm. These were also estimated using an ab initio calculation, as was described in "Intrinsic birefringence in calcium fluoride and barium fluoride." The magnitudes and signs of the measurements and calculations of $\Delta n = n_{<-110>} - n_{<001>}$ for $CaF_2$, $SrF_2$, and $BaF_2$ near 193 nm and 156 nm are shown in Table 1 and plotted in FIG. 1.

TABLE 1

| MATERIAL | $\Delta n \times 10^7$ (193 nm) (measured) | $\Delta n \times 10^7$ (193 nm) (calculated) | $\Delta n \times 10^7$ (156 nm) (measured) | $\Delta n \times 10^7$ (156 nm) (calculated) |
|---|---|---|---|---|
| $CaF_2$ | −3.4 ± 0.2 | −1.3 | −11.8 ± 0.4 | −18 |
| $SrF_2$ | +6.6 ± 0.2 | +9.8 | +5.7 ± 0.3 | +7.3 |
| $BaF_2$ | +19 ± 2 | +27 | +33 ± 3 | +52 |

These show that the magnitudes of the intrinsic birefringences are small ($<10^{-7}$ for $CaF_2$) at long wavelengths but increase as the wavelength gets shorter ($>10^{-6}$ for $CaF_2$ at 156.1 nm). The values of the birefringence at 193.09 nm and at 156.10 nm are large compared to the low-birefringence requirements of a number of precision UV high-numerical-aperture optics applications, in particular 193 nm lithography and 157 nm lithography technologies. The 157 nm lithography birefringence target specification is $\Delta n = 1 \times 10^{-7}$ for 157 nm as taught in Bates.

Both measurement and calculation shows that the sign of the effect for all materials are positive at long wavelengths, but the value for $CaF_2$ has a zero crossing near ~300 nm by measurement (or ~200 nm by theory). For wavelengths below 200 nm, including 193 nm and 157 nm, the value for $CaF_2$ is negative, while that for $SrF_2$ and $BaF_2$ is positive. This is the key result that enables a nulling of the intrinsic birefringence below 200 nm for mixed solid solutions of $CaF_2$ with $SrF_2$ and/or $BaF_2$.

It is important that the birefringence be able to be nulled out for all propagation directions in the crystal. That this is possible was first demonstrated by our symmetry analysis, summarize below, of the effect that showed that the intrinsic birefringence is fully determined for a given material at a given wavelength by a single parameter as described in "intrinsic birefringence in calcium fluoride and barium fluoride."

For a cubic crystal, the dielectric tensor may be expanded in wave vector, as shown in V. M. Agranovich and V. L. Ginzburg, *Crystal Optics with Spatial Dispersion and Exci-* tons, 2nd ed. (Springer-Verlag New York, 1984), pp. 129–135, which is incorporated herein by reference, $$\epsilon_{ij}(q,\omega)=\epsilon(\omega)\delta_{ij}+\Sigma_{kl}\alpha_{ijkl}(\omega)q_k q_l+\ldots, \quad (1)$$

where $\delta_{ij}$ is Kronecker's $\delta$. The product $q_k q_l$ and symmetry of $\epsilon_{ij}$ show that $\alpha_{ijkl}$ is symmetric under interchanges i⇌j and k⇌l. Further, cubic symmetry reduces the number of independent components to the 3 familiar from elasticity theory of H. J. Juretschke, *Crystal Physics* (Benjamin, London, 1974), Sections 4.2 and 11.2, which are incorporated herein by reference. An isotropic system permits two independent tensor components. One component represents an inconsequential change in $\epsilon_{ij}(q, \omega)$ proportional to $q^2$; the other represents an isotropic longitudinal-transverse splitting. The third component that exists in a cubic system (but does not exist in an isotropic system) determines all observable anisotropies. Only this component need be considered. The related tensor elements, $\alpha_{1111}$, $\alpha_{1122}$, and $\alpha_{2323}$, appear in the ratio 2:−1:−1, and this determines the angle dependence. For $\hat{q}=(1,1,0)/2^{1/2}$ the scaled eigenvalues of the contracted tensor $\Sigma_k \alpha_{ijkl} q_k q_l$ are 3/2 and −1 for the transverse [$\bar{1}10$] and [001] directions, respectively. Measuring the associated birefringence for one propagation direction determines the magnitude of the anisotropic response of the crystal for all propagation directions. The magnitude of the intrinsic birefringence in all directions is scaled by a single parameter. Nulling out this single parameter, eliminates the intrinsic birefringence for all propagation directions.

The x value of the mixed solid solutions $Ca_{1-x}Sr_xF_2$ and $Ca_{1-x}Ba_xF_2$ that nulls out the birefringence are predicted approximately by Equation 2:

$$i.x=|\Delta n(CaF_2)/[\Delta n(CaF_2)-\Delta n(YF_2)]|, Y=Sr,Ba \quad (2)$$

The value obtained for $Ca_{1-x}Sr_xF_2$ and $Ca_{1-x}Ba_xF_2$ near 193 nm and 157 nm are shown in table 2.

Figure 2:
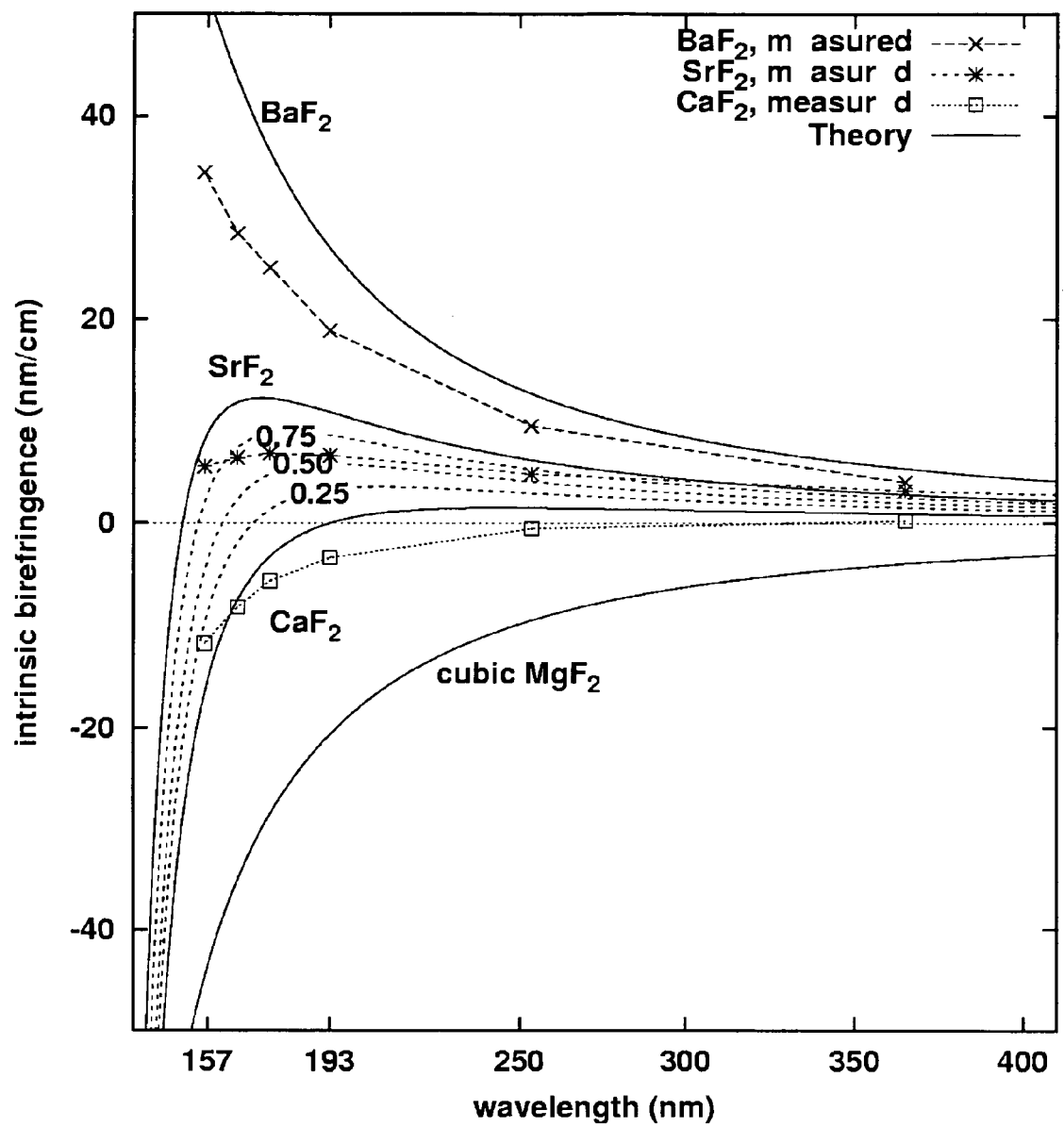
FIG. 2 is a plot depicting the intrinsic birefringence at various wavelengths for compositions including those having different values of Sr fraction x.

As indicated above, these values assume a linear relation between the composition ratio and the birefringence parameter. Actually our calculations show that there is a small nonlinearity in this relationship, and thus a bowing in the composition/birefringence curves. Equation 1 is thus only approximately valid, and the exact nulling ratios must be determined by measurement on the prepared crystals. FIG. 2 shows calculations of the wavelength position of the birefringence null of $Ca_{1-x}Sr_xF_2$ for different values of Sr fraction x.

TABLE 2

| Material | Nulls Intrinsic Birefringence at 193 nm | Nulls Intrinsic Birefringence at 156 nm |
|---|---|---|
| $Ca_{1-x}Sr_xF_2$ | $Ca_{0.66}Sr_{0.34}F_2$ | $Ca_{0.34}Sr_{0.66}F_2$ |
| $Ca_{1-x}Ba_xF_2$ | $Ca_{0.85}Ba_{0.15}F_2$ | $Ca_{0.75}Ba_{0.25}F_2$ |

It has previously been shown that such mixed solid solutions of $CaF_2$, $SrF_2$, and $BaF_2$ can be grown as a single crystal. For example E. G. Chernevskaya and G. V. Anan'eva, "Structure of Mixed Crystals Based on $CaF_2$, $SrF_2$, and $BaF_2$," Soviet Physics-Solid State 8, pp. 169–171 (1966) and separately R. K. Chang, Brad Lacina, and P. S. Pershan, "Raman Scattering from Mixed Crystals $(Ca_xSr_{1-x})F_2$ and $(Ca_xSr_{1-x})F_2$," Phys. Rev. Lett. 17, pp. 755–758 showed that $Ca_{1-x}Sr_xF_2$ formed single crystal solutions with the fluorite ($CaF_2$) crystal structure for all ratios of components and $Ca_{1-x}Ba_xF_2$ formed single crystal solutions with the fluorite ($CaF_2$) crystal structure at least when the composition of the components is low. The indices of $CaF_2$ and $SrF_2$ are fairly similar, e.g., $n(CaF_2)$ near 157 nm=1.559 and $n(SrF_2)$ near 157 nm=1.576, a 1% difference as was demonstrated in John H. Burnett, Rajeev Gupta, and Ulf Griesmann, "Absolute refractive indices and thermal coefficients of $CaF_2$, $SrF_2$, $BaF_2$, and LiF near 157 nm," Applied Optics 41, pp. 2508–2513 (2002). This means that the index of the mixture $Ca_{1-x}Sr_xF_2$ is relatively insensitive to unavoidable concentration gradients. Thus the material could have fairly uniform index, an important requirement for precision optics.

In addition to Ca, Ba, and Sr of the present mixed solid solution composition, some fraction of Mg can be introduced in the mixed solid solution to provide a composition having the form, e.g., $Ca_{1-x-y}Ba_xMg_yF_2$ or $Ca_{1-x-y}Sr_xMg_yF_2$, without altering the cubic crystal structure. As shown in FIG. 2, Mg makes a negative contribution to the intrinsic birefringence, as long as the concentration is low enough that the material retains cubic structure. This increases the range of alloys available for intrinsic birefringence compensation.

The introduction of Mg into the $Ca_{1-x}Ba_xF_2$ growth melt enables higher solid solubilities of Ba in $Ca_{1-x}Ba_xF_2$. The higher solid solubilities is provided by Mg having a smaller ionic radius compared to that of $CaF_2$. Thus, Mg will compensate for the larger radius of $BaF_2$ compared to that of $CaF_2$ to thereby enable higher solid solubilities of Ba in $Ca_{1-x}Ba_xF_2$.

Figure 3:
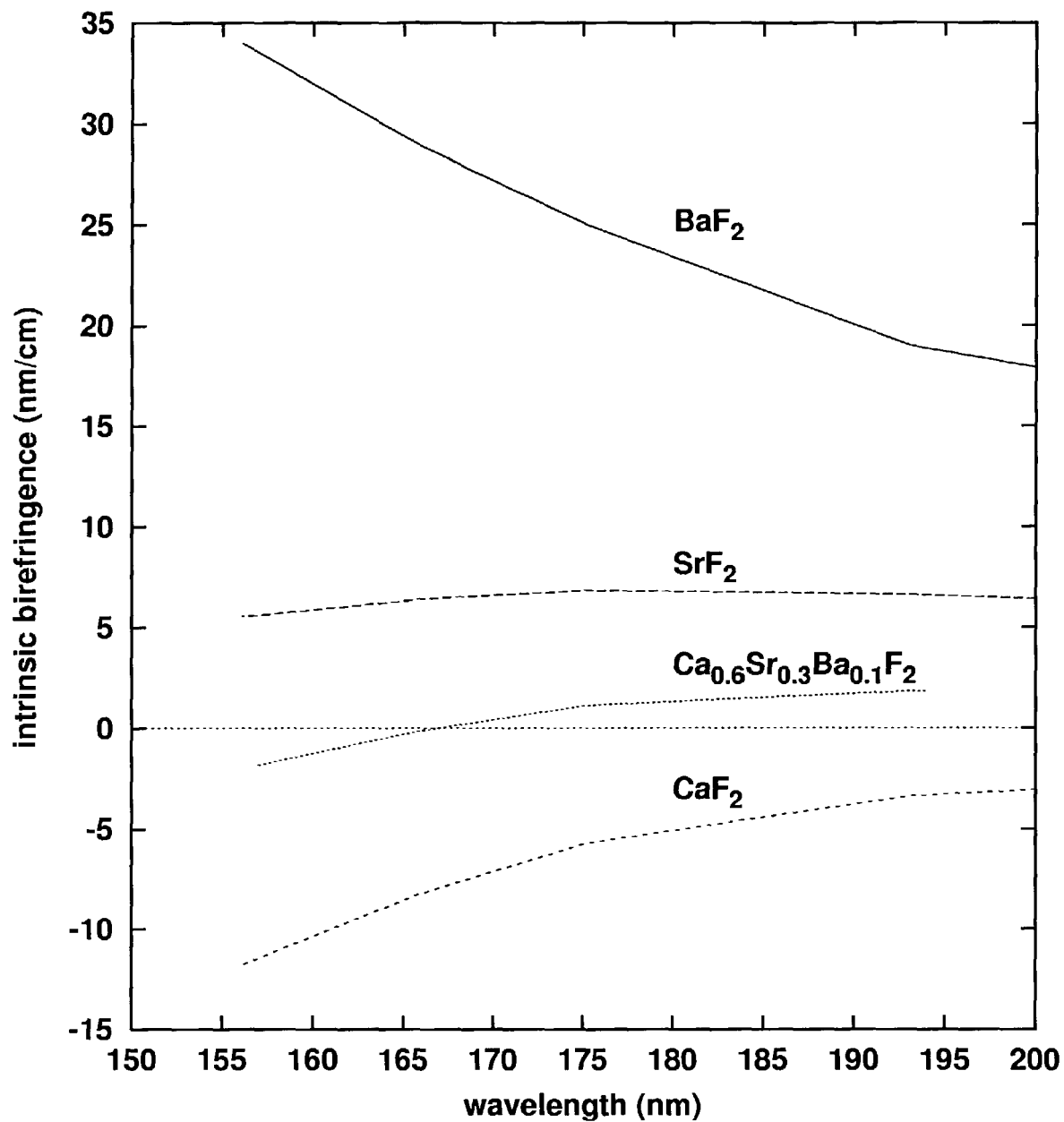
FIG. 3 is a plot depicting the relationship between intrinsic birefringence and wavelength for compositions in accordance with the present invention including $Ca_{1-x-y}Sr_xBa_yF_2$ where x is 0.3, y is 0.1.

By introducing quaternary alloys, e.g., $Ca_{1-x-y}Sr_xBa_yF_2$ or $Ca_{1-x-y}Sr_xMg_yF_2$ or $Ca_{1-x-y}Ba_xMg_yF_2$, a broadband minimization of the intrinsic birefringence is possible. Appropriate values of x and y are chosen to minimize the intrinsic birefringence within the UV range such as, for example, the UV wavelengths of 193 nm and 157 nm. FIG. 3 shows calculations of the intrinsic birefringence of $BaF_2$, $SrF_2$, $CaF_2$, and the quaternary mixed solid solution $Ca_{0.6}Sr_{0.3}Ba_{0.1}F_2$. The quaternary mixed solid solution shows a broadband minimization of the intrinsic birefringence, with an absolute maximum value of 1.85 between 157 nm and 193 nm.

Further, the freedom to null out the birefringence for different x and y values enables the creation of intrinsic-birefringent-free materials with different indices and dispersions. Optics with nulled birefringence from a family with distinct (x, y) values or for from different families can be combined for correction of chromatic aberrations (the minimizing the derivative of the index of refraction with respect to source wavelength) due to the different index properties.

Although the invention has been described above in relation to preferred embodiments thereof, it will be understood by those skilled in the art that variations and modifications can be effected in these preferred embodiments without departing from the scope and spirit of the invention.

What is claimed is:

1. A composition comprising a mixture of $CaF_2$ crystal and a second alkaline earth fluoride having spatial dispersion induced birefringence opposite to the birefringence of the $CaF_2$ crystal the $CaF_2$ crystal and the second crystal being present in amounts such that composition has minimal spatial dispersion induced birefringence at a selected wavelength within the UV range and said composition further comprising Mg.

2. The composition of claim 1, wherein the composition is in the form $Ca_{1-x-y}Ba_xMg_yF_2$.

3. The composition of claim 1, wherein said second crystal is $SrF_2$.

4. The composition of claim 3, wherein the composition is in the form $Ca_{1-x-y}Sr_xMg_yF_2$.

5. The composition of claim 1, wherein said selected wavelength is between 193 to 157 nm.

6. A composition comprising a mixture of $CaF_2$ crystal and a second alkaline earth fluoride having spatial dispersion induced birefringence opposite to the birefringence of the $CaF_2$ crystal the $CaF_2$ crystal and the second crystal being present in amounts such that composition has minimal spatial dispersion induced birefringence at a selected wavelength within the UV range, said composition further comprising Sr, said second crystal comprising Ba, and said composition being in the form of $Ca_{1-x-y}Sr_xBa_yF_2$.

7. A method of making non-birefringent material comprising the steps of:
   a) selecting a wavelength, and
   b) mixing $CaF_2$ crystal with a second alkaline earth fluoride having spatial dispersion induced birefringence opposite to the birefringence of the $CaF_2$ crystal and the $CaF_2$ crystal and the second crystal being present in amounts such as to form a composition having minimized spatial dispersion induced birefringence at the selected wavelength, said second crystal comprising $BaF_2$.

8. The method of claim 7, wherein the wavelength is selected within the UV range.

9. The method of claim 7, wherein said mixing $CaF_2$ crystal with a second crystal comprises mixing $CaF_2$ with Ba to form the composition $Ca_{1-x}Ba_xF_2$ and selecting a value for x to minimize the spatial dispersion induced birefringence at the selected wavelength.

10. A method of making non-birefringent material comprising the steps of:
    a) selecting a wavelength, and
    b) mixing $CaF_2$ crystal with a second crystal to form a composition having minimized spatial dispersion induced birefringence at the selected wavelength, wherein the second crystal is $SrF_2$ and said mixing $CaF_2$ crystal with a second crystal comprises mixing $CaF_2$ with $SrF_2$ to form the composition $Ca_{1-x}Sr_xF_2$ and selecting a value for x to minimize the spatial dispersion induced birefringence at the selected wavelength.

11. The method of claim 7, wherein said mixing $CaF_2$ crystal with a second crystal further comprises mixing $CaF_2$ with the $BaF_2$ and $SrF_2$ to form the composition $Ca_{1-x-y}Sr_xBa_yF_2$ and selecting values for x and y to minimize the spatial dispersion induced birefringence at the selected wavelength.

12. The method of claim 7, wherein said mixing CaF2 crystal with a second crystal further comprises mixing $CaF_2$ with Ba and Mg to form the composition $Ca_{1-x-y}Ba_xMg_yF_2$ and selecting values for x and y to minimize the spatial dispersion induced birefringence at the selected wavelength.

13. A method of making non-birefringent material comprising the steps of:
    a) selecting a wavelength, and
    b) mixing $CaF_2$ crystal with a second crystal to form a composition having minimized spatial dispersion induced birefringence at the selected wavelength wherein the second crystal comprises $SrF_2$ and said mixing $CaF_2$ crystal with a second crystal further comprises mixing $CaF_2$ with Sr and Mg to form the composition $Ca_{1-x-y}Sr_xMg_yF_2$ and selecting values for x and y to minimize the spatial dispersion induced birefringence at the selected wavelength.

14. The method of claim 7, wherein said wavelength is between 157 to 193 nm.

15. A device comprising:
    an optical element formed from at least one composition comprising a mixture of $CaF_2$ crystal and at least one additional crystal, said composition selected from the group consisting of $Ca_{1-x-y}Sr_xBa_yF_2$, $Ca_{1-x-y}Sr_xMg_yF_2$, and $Ca_{1-x-y}Ba_xMg_yF_2$, where x and y having values selected so as to form the composition with minimized intrinsic birefringence.

16. The device of claim 15, wherein the optical element comprises at least two compositions selected from the group consisting of $Ca_{1-x-y}Sr_xBa_yF_2$, $Ca_{1-x-y}Sr_xMg_yF_2$, and $Ca_{1-x-y}Ba_xMg_yF_2$ with x and y have values to minimize or eliminate chromatic aberrations when electromagnetic energy interacts with said composition.

17. A device comprising:
    an optical element formed from at least one composition selected from the group consisting of $Ca_{1-x-y}Sr_xMg_yF_2$, and $Ca_{1-x-y}Ba_xMg_yF_2$, where x and y are values selected such that the composition has minimized intrinsic birefringence.

* * * * *